United States Patent [19]

Shekleton

[11] Patent Number: 4,920,740

[45] Date of Patent: May 1, 1990

[54] STARTING OF TURBINE ENGINES

[75] Inventor: Jack R. Shekleton, San Diego, Calif.

[73] Assignee: Sundstrand Corporation, Rockford, Ill.

[21] Appl. No.: 124,073

[22] Filed: Nov. 23, 1987

[51] Int. Cl.⁵ .............................................. F02C 7/26
[52] U.S. Cl. .................................. 60/39.141; 60/739
[58] Field of Search .................. 60/39.141, 39.36, 734, 60/739, 740, 741, 746

[56] References Cited

U.S. PATENT DOCUMENTS

| | | | |
|---|---|---|---|
| 2,984,970 | 5/1961 | Bertaux et al. .................. | 60/39.141 |
| 3,335,567 | 8/1967 | Hemsworth ........................ | 60/739 |
| 3,613,360 | 10/1971 | Howes ................................. | 60/39.36 |
| 4,027,473 | 6/1977 | Baker ................................. | 60/39.281 |
| 4,638,628 | 1/1987 | Rice ................................... | 60/39.36 |
| 4,649,700 | 3/1987 | Gardiner et al. . | |
| 4,711,085 | 12/1987 | Lyons ............................... | 60/39.141 |

FOREIGN PATENT DOCUMENTS 132729  6/1986  Japan ..................................... 60/739

Primary Examiner—Louis J. Casaregola
Attorney, Agent, or Firm—Wood, Dalton, Phillips, Mason & Rowe

[57] ABSTRACT

The turbine engine may be started without the use of start injectors by a method including the steps of initiating rotation of a compressor and turbine wheel by applying an external angular accelerating force thereto, introducing fuel through a minority of the fuel injectors employed at about 5-10% of rated engine speed while continuing the application of the accelerating force, introducing fuel through the remainder of the injectors after ignition of the fuel introduced by the prior step and when the engine reaches 15-25% of rated speed while maintaining injection through the minority of injectors, and thereafter modulating fuel flow through all of the injectors to operate the engine in a desired fashion. Also disclosed is a turbine engine practicing the foregoing method.

1 Claim, 2 Drawing Sheets

STARTING OF TURBINE ENGINES

FIELD OF THE INVENTION

This invention relates to air breathing turbine engines, and more specifically, to a method and means for starting such engines.

BACKGROUND OF THE INVENTION

Air breathing turbines typically include, as major components, a turbine wheel coupled to a rotary compressor. A combustor receives compressed air from the compressor as well as fuel from a fuel source and burns the same to provide hot gasses of combustion to drive the turbine wheel.

Many such systems employ so-called "annular" combustors. Such a combustor includes a somewhat toroidal-shaped combustion chamber centered about the rotational axis of the turbine wheel and there are provided a plurality of circumferentially or angularly spaced fuel injectors which inject fuel into the annular combustion space as well as air to support combustion during normal operation.

In the usual case, the injectors are of two different types. One type is a so-called "start" injector and the other type is a so-called "main" injector. Generally speaking, the main injectors will substantially outnumber the start injectors and the start injectors are employed only during the start-up sequence for the turbine. The main injectors are not used to initiate start-up of the turbine but may be employed in later stages of a start-up operation as well as during normal turbine operation.

Generally speaking, the start injectors are configured to provide for good atomization of the fuel. Good atomization at the injection nozzles is necessary because during start-up, the velocity of compressed air received from the compressor is relatively low (because the apparatus is rotating at a relatively low speed). Thus, air velocity cannot be utilized to enhance atomization.

Frequently, to achieve the enhanced atomization of fuel that is required at low engine rotational speeds, relatively high volumes of fuel are pumped through those nozzles, nozzles typically providing better atomization for higher pressure drops across the nozzle and/or higher flow rates. This, however, results in local overfueling which in turn causes combustion inefficiencies and damaging hot streaks, i.e., the formation of undesirable hot spots which may damage the combustor. Thus, conventional starting systems have drawbacks in terms of requiring two different types of injectors (which tends to multiply the total number of injectors involved and thereby increase expense), requiring a relatively large number of control valves, and being prone to the formation of undesirable hot spots.

The present invention is directed to overcoming one or more of the above problems.

SUMMARY OF THE INVENTION

A principal object of the invention is to provide a new and improved turbine engine, particularly of a relatively small size. More particularly, it is an object of the invention to provide an improved means for starting such an engine. Another facet of the invention contemplates an improved method of starting such an engine.

According to one facet of the invention, there is provided a rotary turbine wheel along with a rotary compressor coupled to the wheel. An annular combustor is provided for receiving air from the compressor and fuel from a fuel source, combusting the same and providing gasses of combustion to the turbine wheel to drive the same. A plurality of fuel injectors include fuel injecting nozzles angularly spaced about the combustor and a fuel pump is provided to pump fuel to the nozzles. First and second main fuel valves are provided and the first valve is operable to connect a minority of the injectors to the fuel pump for starting the engine. The first and second valves are further operable to connect all of the injectors to the fuel pump for causing normal operation of the engine. The engine is further characterized by the absence of start fuel injectors for the combustor.

According to one facet of the invention, the fuel injectors are substantially identical.

Ideally, the system includes a control schedule valve and the first and second main fuel valves are operable to connect the injectors, as aforesaid, to the fuel pump and to the control schedule valve.

In a highly preferred embodiment of the invention, the injectors all inject fuel into the annular combustor in a generally tangential direction. Preferably, air is introduced tangentially as well.

In one embodiment of the invention, the minority of injectors is made up of at least two equally angularly spaced injectors and in one embodiment, there is an even number of the injectors and the minority of the injectors consists of two diametrically opposite injectors.

The invention also contemplates a method of starting a small turbine engine having a turbine wheel, a rotary compressor coupled to the turbine wheel, an annular combustor provided with a plurality of angularly spaced fuel injectors and characterized by the absence of start injectors. The method includes the steps of (a) initiating rotation of the compressor and the turbine wheel by applying an external angular accelerating force thereto; (b) at about 5-10% of the rated engine speed, providing fuel to a minority of the injectors while continuing application of the accelerating force; (c) after ignition of the fuel introduced during step (b), and when the engine reaches 15-25% of its rated speed, introducing fuel into the combustor through the remainder of the injectors while maintaining injection through the minority of injectors; and (d) thereafter modulating fuel flow through all of the injectors to operate the engine in a desired fashion.

In a preferred embodiment, step (b) is performed at approximately 7-8% of rated engine speed and step (c) is initiated at an engine speed on the order of 20% of rated engine speed.

In a highly preferred embodiment, the introduction of fuel, as well as combustion air, is in the tangential direction.

Other objects and advantages will become apparent from the following specification taken in connection with the accompanying drawings.

DESCRIPTION OF THE PREFERRED EMBODIMENT

Figure 1:
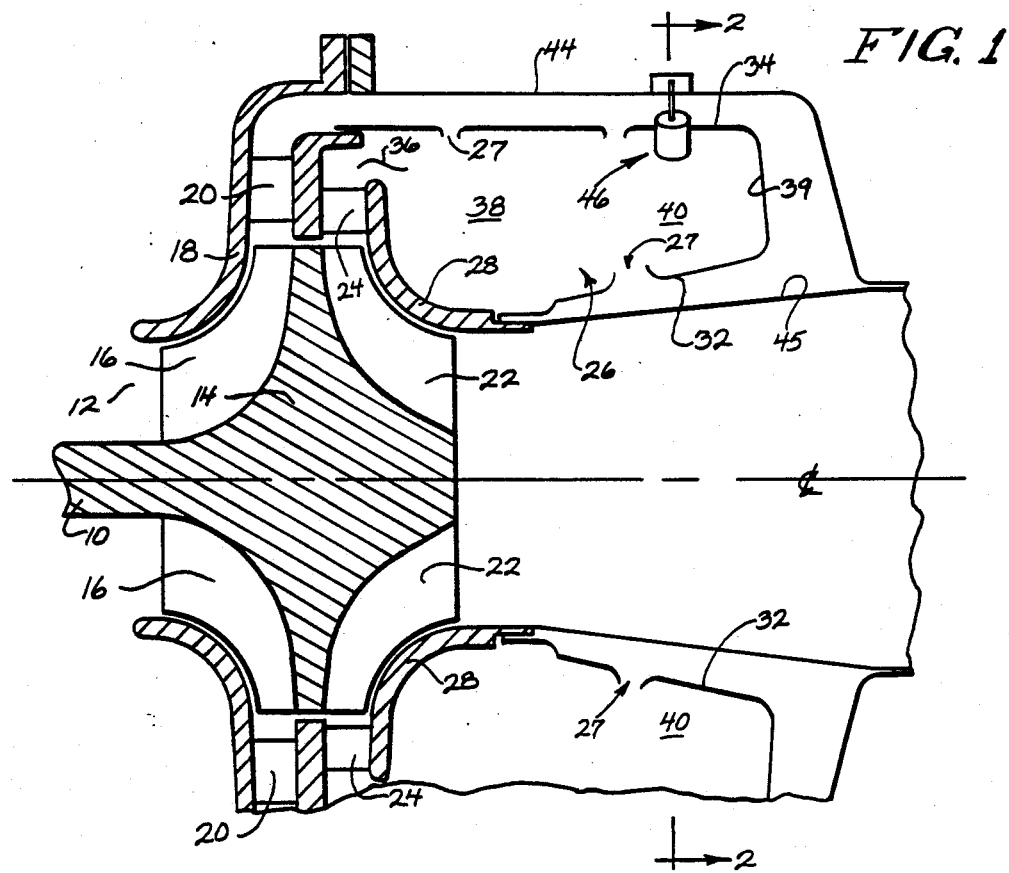
FIG. 1 is a somewhat schematic, sectional view of a small turbine engine made according to the invention.

An exemplary embodiment of a gas turbine made according to the invention is illustrated in the drawings in the form of a radial flow, air breathing gas turbine. However, the invention is not limited to radial flow turbines and may have applicability to any form of air breathing turbine having an annular combustor.

The turbine includes a rotary shaft 10 journaled by bearings not shown. Adjacent one end of the shaft 10 is an inlet area 12. The shaft 10 mounts a rotor, generally designated 14, which may be of conventional construction. Accordingly, the same includes a plurality of compressor blades 16 adjacent the inlet 12. A compressor blade shroud 18 is provided in adjacency thereto and just radially outwardly of the radially outer extremities of the compressor blades 18 is a conventional diffuser 20.

Oppositely of the compressor blades 16, the rotor 14 has a plurality of turbine blades 22. Just radially outwardly of the turbine blades 22 is an annular nozzle 24 which is adapted to receive hot gasses of combustion from an annular combustor, generally designated 26. The compressor system including the blades 16, shroud 18 and diffuser 20 delivers compressed air to the annular combustor 26, and via dilution air passages 27, to the nozzle 24 along with the gasses of combustion. That is to say, hot gasses of combustion from the combustor are directed via the nozzle 24 against the blades 22 to cause rotation of the rotor, and thus the shaft 10. The latter may be, of course, coupled to some sort of apparatus requiring the performance of useful work.

A turbine blade shroud 28 is interfitted with the combustor 26 to close off the flow path from the nozzle 24 and confine the expanding gas to the area of the turbine blades 22.

The combustor 26 has a generally cylindrical inner wall 32, and a generally cylindrical outer wall 34. The two are concentric and merge to a necked down area 36 which serves as an outlet from an interior annulus 38 of the combustor 26 to the nozzle 24. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor 26 includes a primary combustion zone 40 in which the burning of fuel primarily occurs. Other combustion may, in some instances, occur downstream from the primary combustion area 40 in the direction of the outlet 36. As mentioned earlier, provision is made for the injection of dilution air through the passages 27 into the combustor 26 downstream of the primary combustion zone 40 to cool the gasses of combustion to a temperature suitable for the application to turbine blades 22 via the nozzle 24.

In any event, it will be seen that the primary combustion zone 40 is an annulus or annular space defined by the generally radially inner wall 32, the generally radially outer wall 34 and the wall 39.

A further wall 44 is generally concentric to the walls 32 and 34 and is located radially outwardly of the latter. The wall 44 extends to the outlet of the diffuser 20 and thus serves to contain and direct compressed air from the compressor system to the combustor 26. Mounted on the wall 44 and extending through the wall 34 are injectors, generally designated 46.

Figure 2:
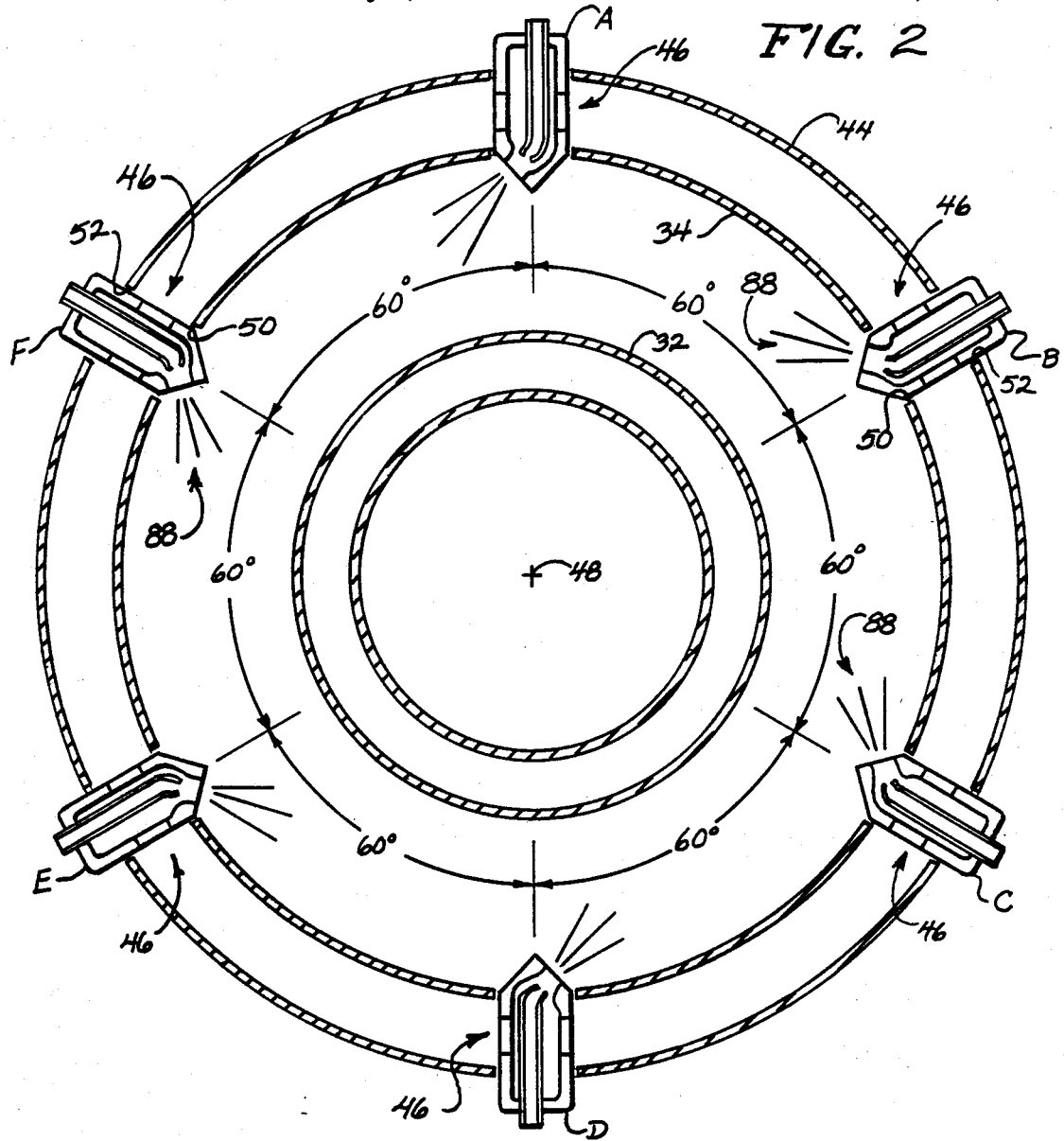
FIG. 2 is a sectional view taken approximately along the line 2—2 in FIG. 1.

As seen in FIG. 2, according to a preferred embodiment of the invention, there are six of the injectors 46 equally angularly spaced about the axis of rotation of the shaft 10 which is shown by point 48. The injectors 46 extend into the primary combustion zone 40 by means of aligned apertures 50 and 52 respectively in the walls 34 and 44.

Figure 3:
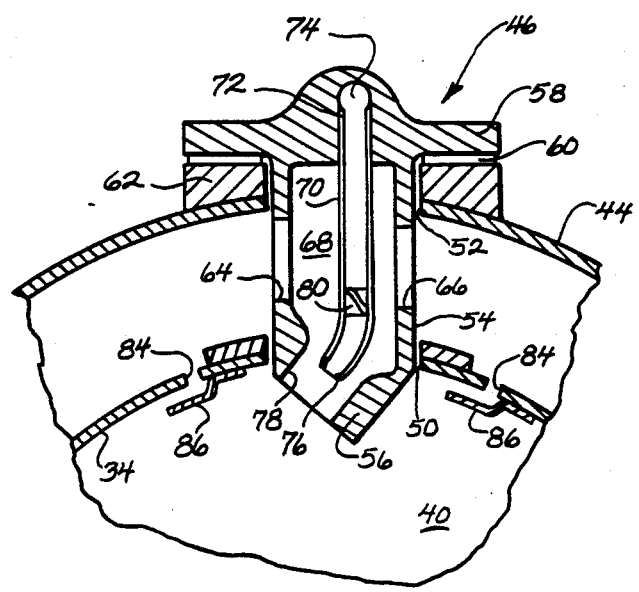
FIG. 3 is an enlarged, fragmentary sectional view of an injector.

With reference to FIGS. 2 and 3, each injector 46 includes a generally cylindrical housing 54 terminating in a radially inward elbow section 56. Opposite the elbow section 56, the housing 54 has a peripheral retaining flange 58 which may be sealed by a gasket 60 against a mounting surface 62 on the exterior of the radially outer wall 44.

That part of the housing 54 disposed between the walls 34 and 44 is provided with one or more openings 64, 66 which open to the space between the walls 34 and 44. Thus, compressed air from the compressor may flow through the holes 64, 66 to the interior 68 of the housing 54.

Within the interior 68 of the housing 54 there is disposed a somewhat J-shaped tube 70. The radially outer end 72 of the tube 70 is in fluid communication with a fuel manifold 74 while the radially inner end 76 is angled to correspond with the elbow section 56 of the housing 54 and to be centered about a reduced diameter opening 78 therein.

Preferably, a fuel swirler 80 may be located within the tube 70 in proximity to the end 76 which serves as an injector nozzle.

The angle of the elbow section 56 and the end 76 of the tube 70 is such that both fuel and air will enter the primary combustion zone 40 generally tangentially as indicated schematically by spray patterns, generally designated 82, as shown in FIG. 2. Provision may also be made for the introduction of dilution air into the periphery of the primary combustion zone 40 in a tangential direction by the provision of a series of axial lines of apertures 84 and axially elongated cooling strips 86 as illustrated in FIG. 3.

The tangential injection of fuel and combustion air via the injectors 46 as well as tangential introduction of dilution air as just described provides for a high degree of circumferential swirl within the primary combustion zone 40 and thus is highly desirable, though not absolutely necessary, in practicing the invention since it minimizes the number of injectors required to provide an even distribution of mixed air and fuel. In this respect, the invention lends itself readily to use in relatively small turbine engines. In such engines, because of their relatively small size, fuel injectors have heretofore included very small fuel injection passages which are highly subject to clogging. Individual passage size for a given engine can be increased by reducing the number of injectors, thereby allowing each injector to have a larger fuel passage but this can result in the tendency to develop hot spots. According to the invention, the number of injectors may be minimized in the exemplary turbine engine because the swirl of burning fuel provides even temperature distribution throughout the primary combustion zone 40.

As illustrated in FIG. 2, there are six, equally angularly spaced ones of the injectors 46 and they are at locations given alphabetical characters A through F, respectively. A system for providing the same with fuel is illustrated schematically in FIG. 4 and is seen to include a fuel tank 90 connected to the suction side of a fuel pump 92. A bypass line 94 including a pressure relief valve 96 is provided about the pump 92 to return fuel to the inlet side of the pump 92 in the event outlet side pressure exceeds a predetermined level.

Downstream of the pump 92 and the bypass line 94 is a control schedule valve 98 which is operated to control the flow of fuel from the pump 92 to the injector system as will be seen. The control schedule valve 98 is operated according to conventional techniques to modulate the flow of fuel, primarily during normal operation of the turbine engine. However, according to the invention, it can be utilized to modulate fuel flow during start-up as well.

Figure 4:
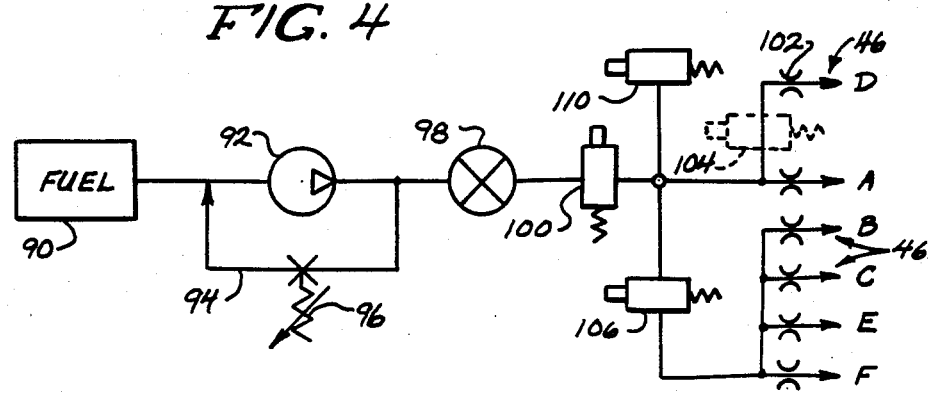
FIG. 4 is a schematic of a fuel distribution system.

Just downstream of the control schedule valve 98 is a solenoid operated valve 100 constituting a first main solenoid valve. The injectors 46 at positions A and D are connected directly to the downstream side of the valve 100. As illustrated in FIG. 4, they are provided with internal orifices 102 for conventional purposes. If desired, a solenoid valve 104 shown in dotted lines in FIG. 4, may be interposed between the injector 46 at position D in the solenoid valve 100.

A second main solenoid valve 106 is connected to the downstream side of the first main solenoid valve 100 and the injectors 46 at positions B, C, E and F are all connected to the valve 106.

The system is basically completed by a purge valve 110 which is also connected to the outlet side of the first main solenoid valve 100.

According to a preferred embodiment, each of the injectors 46 at each of the positions A-F, inclusive, is identical one to the other. That is to say, they are all main fuel injectors and it will be appreciated from the review of the foregoing description as well as a review of the drawings, particularly FIG. 2, that the turbine engine is characterized by the absence of even a single start injector.

In normal operation of the turbine engine, the solenoid valves 100 and 106, and the solenoid valve 104 if present, will all be open and fuel injection will be occurring at each of the positions A-F, inclusive, the amount of fuel being injected being determined by operation of the control schedule valve 98 in a conventional fashion.

To shut down the engine, the first main solenoid valve 100 is closed and the purge solenoid valve 110 opened to purge all fuel from the system.

In starting the turbine engine, an external accelerating force is applied to the shaft 10 as by a starter motor (not shown). As the rotor begins to accelerate, in the range of about 5-10% of rated engine speed, and preferably in the range of about 7-8% of rated engine speed, the first main solenoid valve 100 is opened and fuel is injected into the primary combustion zone at the locations A and D. If the start-up of the engine is to occur at a high altitude as when the turbine is utilized in an aircraft, and if the solenoid valve 104 is included, the same will remain closed so that injection will only occur at area A because of the low fuel flow rate that is desired for high altitude start-ups.

In any event, generally at about 10% of rated speed, ignition of the fuel thus injected will occur. By a suitable temperature sensor (not shown) placed in the engine downstream of the turbine blades 22, the resulting rise in exhaust temperature can be sensed and through conventional controls, the second main fuel solenoid valve 106 opened. In a typical case, the resulting injection of fuel at the locations B, C, E and F will occur at an engine speed in the range of about 15-25% of rated engine speed and more specifically, at an engine speed on the order of about 20% of rated engine speed. If present, the solenoid valve 104 will be opened at this time simultaneously with the second main solenoid valve 106 or at some point in time intermediate the opening of the first main solenoid valve 100 and the opening of the second main solenoid valve 106 as desired.

Acceleration of the shaft will continue to occur and injection at all six locations A-F inclusive will be modulated for optimum fuel flow by conventional control of the control schedule valve 98; and the engine will shortly obtain 100% of rated speed.

Thus, the invention provides a means of eliminating any need for specialized start injectors. By reason of the fact that tangential injection of combustion air and fuel allows the use of fewer injectors, a high degree of atomization necessary for starting can nonetheless be obtained through the use of main injectors which may not have the atomizing characteristics of start injectors. In particular, even though air flow through the system will be low during the starting of the invention, thus inhibiting atomization, because only two injectors 46 are utilized (and only one injector 46 at high altitude), sufficient fuel flow through the same and/or pressure drop across the same necessary to achieve the desired high degree of atomization necessary for starting can be obtained. Indeed, the two injectors may be overfueled during start-up in order to obtain ignition without concern for the creation of hot spots because the tangential flow of fuel and air within the annular combustor 40 evens temperatures throughout. Such overfueling can be immediately cut back by appropriate control of the control schedule valve 98 once a rising exhaust gas temperature indicating that ignition has been obtained is sensed.

What is claimed:

1. A relatively small turbine engine comprising;
    a rotary turbine wheel;
    a rotary compressor coupled to said turbine wheel;
    an annular combustor for receiving air from said compressor and fuel from a fuel source, combusting the same and providing gases of combustion to said turbine wheel to drive the same;
    a plurality of substantially identical main fuel injectors including fuel injecting nozzles angularly spaced about said compressor;
    fuel and air from said compressor being introduced into said combustor generally in the tangential direction;
    a fuel pump;
    a control schedule valve; and
    first and second main fuel solenoid valves;
    said first valve being operable to connect a minority of said injectors to said control schedule valve and said fuel pump for starting said engine, there being an even number of said injectors and said minority of injectors consisting of two diametrically opposite injectors;
    said first and second valves being operable to connect all of said injectors to said control schedule valve and said pump for causing normal operation of said engine;
    said engine further being characterized by the absence of start fuel injectors for said combustor.

* * * * *